US009392296B2

(12) United States Patent
Bodo et al.

(10) Patent No.: US 9,392,296 B2
(45) Date of Patent: Jul. 12, 2016

(54) MEDIA DECODER AND A DECODING METHOD ALLOWING FOR THE MEDIA DECODER TO BE TRACED

(75) Inventors: Yann Bodo, Paris (FR); Corinne Le Buhan, Les Paccots (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 345 days.

(21) Appl. No.: 13/363,859

(22) Filed: Feb. 1, 2012

(65) Prior Publication Data

US 2012/0195383 A1    Aug. 2, 2012

Related U.S. Application Data

(60) Provisional application No. 61/438,654, filed on Feb. 2, 2011.

(51) Int. Cl.
| | |
|---|---|
| *H04N 7/26* | (2006.01) |
| *H04N 19/467* | (2014.01) |
| *H04N 19/176* | (2014.01) |
| *H04N 19/122* | (2014.01) |

(52) U.S. Cl.
CPC .......... *H04N 19/467* (2014.11); *H04N 19/122* (2014.11); *H04N 19/176* (2014.11)

(58) Field of Classification Search
None
See application file for complete search history.

(56) References Cited

U.S. PATENT DOCUMENTS

| | | | | |
|---|---|---|---|---|
| 5,706,290 | A * | 1/1998 | Shaw et al. ................ | 370/465 |
| 6,301,304 | B1 * | 10/2001 | Jing et al. ................ | 375/240.25 |
| 6,532,541 | B1 * | 3/2003 | Chang .................. | G06T 1/0028 380/216 |
| 8,374,237 | B2 * | 2/2013 | Demos et al. ............ | 375/240.03 |
| 8,995,711 | B2 * | 3/2015 | Thorwirth ............ | G06T 1/0092 382/100 |
| 2002/0054218 | A1 * | 5/2002 | Kobayashi et al. ........... | 348/220 |
| 2002/0186405 | A1 * | 12/2002 | Gragg et al. ................ | 358/1.15 |
| 2004/0024588 | A1 | 2/2004 | Watson et al. | |
| 2004/0057517 | A1 * | 3/2004 | Wells ...................... | 375/240.16 |
| 2004/0120404 | A1 * | 6/2004 | Sugahara et al. ........ | 375/240.23 |
| 2004/0247154 | A1 * | 12/2004 | Bodo .................... | G06T 1/0085 382/100 |
| 2006/0009247 | A1 * | 1/2006 | Kelley et al. ................ | 455/515 |
| 2006/0098732 | A1 * | 5/2006 | Bruna et al. ............. | 375/240.03 |
| 2006/0133644 | A1 * | 6/2006 | Wells et al. .................. | 382/100 |
| 2006/0200412 | A1 * | 9/2006 | Fahrny et al. .................. | 705/50 |
| 2007/0073795 | A1 * | 3/2007 | Miller et al. .................. | 708/400 |
| 2007/0242826 | A1 * | 10/2007 | Rassool ............... | G10L 19/018 380/201 |
| 2007/0274687 | A1 * | 11/2007 | Varekamp et al. .......... | 386/109 |

(Continued)

OTHER PUBLICATIONS

European Search Report issued in EP 12 15 2042, dated Jun. 15, 2012.

(Continued)

*Primary Examiner* — Dave Czekaj
*Assistant Examiner* — Mohammad J Rahman
(74) *Attorney, Agent, or Firm* — DLA Piper LLP (US)

(57) ABSTRACT

The present invention aims to overcome drawbacks of conventional content tracing methods requiring re-processing the content before its broadcast with a significant side channel transmission i.e. extra processing, storage and/or bandwidth at the distribution side, or alternately a complex signal processing implementation at the receiver side that has to be protected against hackers attacks. An efficient system and method consists of tracing and uniquely identifying decoders of a video stream wherein the decoders implement at least one variant of a standard image decompression algorithm and wherein the resulting decompressed image approximation varies according to the decoders' identifier.

16 Claims, 2 Drawing Sheets

(56) References Cited

U.S. PATENT DOCUMENTS

| | | | |
|---|---|---|---|
| 2008/0062988 A1* | 3/2008 | Daigle | 370/392 |
| 2008/0181308 A1* | 7/2008 | Wang et al. | 375/240.16 |
| 2009/0220074 A1* | 9/2009 | Moskowitz et al. | 380/42 |
| 2009/0323799 A1* | 12/2009 | Mcdade, Sr. | 375/240.01 |
| 2010/0281539 A1* | 11/2010 | Burns | H04L 63/1441 726/23 |
| 2011/0080958 A1* | 4/2011 | Srpljan | G06T 9/00 375/240.25 |
| 2012/0163470 A1* | 6/2012 | Wu et al. | 375/240.23 |
| 2013/0236010 A1* | 9/2013 | Schultz et al. | 380/200 |
| 2013/0246784 A1 | 9/2013 | Zhang et al. | |

OTHER PUBLICATIONS

"IEEE Standard Specifications for the implementations of 8×8 Inverse Discrete Cosine Transform", IEEE Standard 1180-1990, IEEE, Mar. 18, 1991 (12 pages).

Seung-Kyun Oh et al., "Analysis of IDCT and Motion-Compensation Mismatches Between Spatial-Domain and Transform-Domain Motion-Compensated Coders", IEEE Transaction on Circuits and Systems for Video Technology, vol. 15, No. 7, pp. 835-843, Jul. 2005.

* cited by examiner

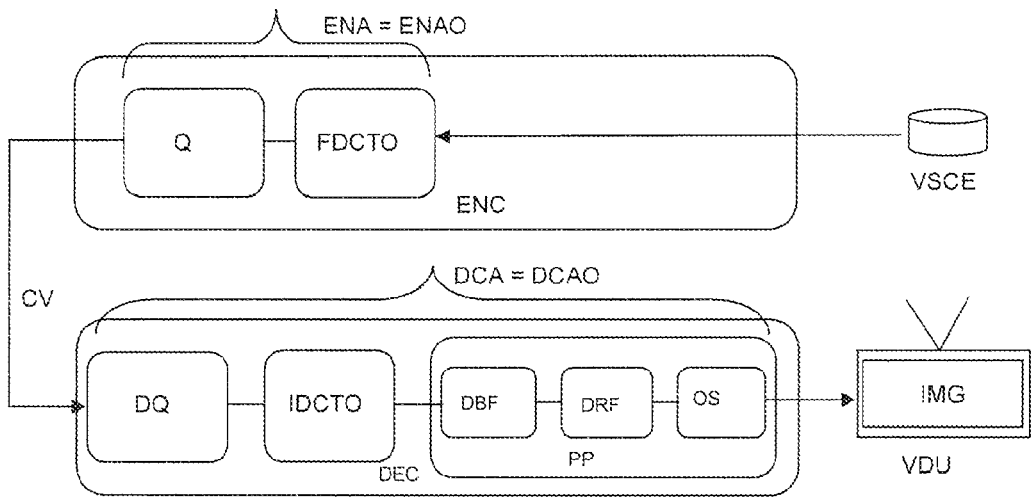
Figure 1 - Prior Art
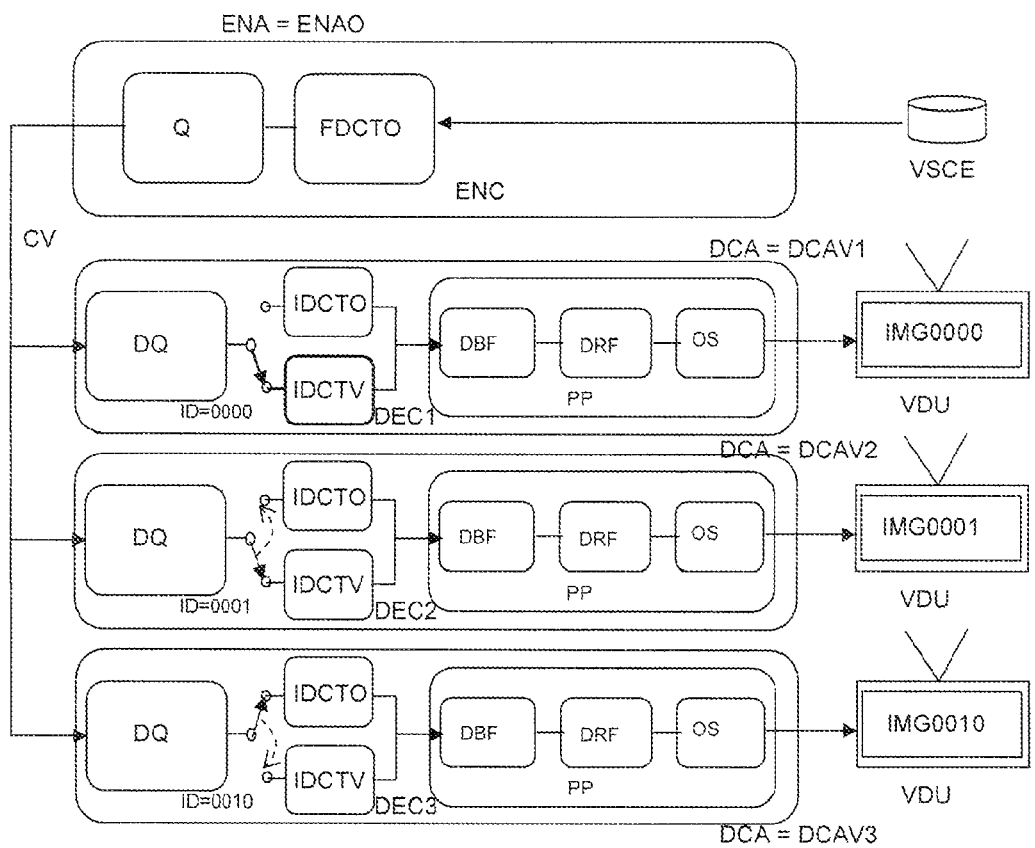
Figure 2

MEDIA DECODER AND A DECODING METHOD ALLOWING FOR THE MEDIA DECODER TO BE TRACED

CROSS REFERENCE TO RELATED APPLICATIONS

This application claims the benefit of U.S. Provisional Application No. 61/438,654, filed Feb. 2, 2011, the entire contents of which are hereby incorporated by reference herein.

FIELD OF THE INVENTION

This invention concerns the field of monitoring and tracing a media work back to a distribution source in order to identify illegal or undesirable media publishers or distributors.

TECHNICAL BACKGROUND

The development of digital networking combined with that of multimedia processing in the past two decades has resulted in ever-increasing digital content sharing. This raises specific issues both for commercial content providers who lose a significant source of revenue when a single piece of content is freely shared by consumers or published over the internet and for end users desiring to limit access of their personal content to their private network of friends and relatives for privacy concerns.

Media content protection against unauthorized content access, redistribution or use has long been based upon encryption of the content distribution packets. However, ultimately, the content has to be in the clear to be accessed by the end user, so content protection against unauthorized content access, redistribution or usage is a fundamentally ill-posed problem. In practice though, thanks to the reality constraints of designing a perfect hacking system at a reasonable cost and in a reasonable time, it is still possible to address this problem in the real world by designing pragmatic content protection systems based on a smart serialization of security barriers that have to be regularly adapted to the hacking threats subject to fast evolving reverse engineering technical capabilities and cost accessibility. Examples of such barriers are:
  tamper-resistant hardware designs—e.g. smartcards and secure descrambling chipsets that are typically serialized into a secure STB architecture design;
  tamper-resistant software designs—for instance based upon key cascading, white-box cryptography and implementation diversity that are typically combined into an obfuscated software architecture design.

In broadcast applications, initial systems were designed to carefully protect the rights management keys, then more and more directly the content keys. However, in the end the content still ends up in the clear, so the next security engineering challenge lies in the design of content protection schemes as close as possible to the content decoding stage, either in the decoder silicon implementation of a consumer device chipset (such for instance as a Set-Top-Box STB, a television, a tablet or a handheld device) or in the software decoder implementation of a media player for mobile or PC devices.

As the trade-off between content protection design complexity and end-to-end content security efficiency may no longer be economically viable, content tracing is of particular interest. To this end, the content is individually marked to enable traceability of its leakage source and consequently enable legal or technical answers targeted at that source specifically.

Content tracing may also be used in combination with conventional content protection mechanisms. It is of particular importance in the framework of software implementations in open devices such as personal computers that intrinsically facilitate reverse engineering of the security design, algorithms and keys.

A number of solutions have been proposed to address the content tracing problem, such as watermarking the content to embed an invisible signal carrying identification information into the audio, picture or video signal. The main drawback of those tracing solutions is that in a conventional broadcast application, they either require reprocessing the content before its broadcast with a significant side channel transmission i.e. extra processing, storage and/or bandwidth at the distribution side, or alternately a complex signal processing implementation at the receiver side that has to be carefully designed again against receiver hacking.

Methods for embedding a watermark in media content are known in the state of the art. The owner of content adds the watermark to his content and distributes the content. In some methods a content owner who later finds a copy of content that he has distributed, is able to identify his watermark and simply conclude that the particular copy is a pirate copy, without being able to pinpoint where it came from. In other methods the watermark may allow for the source of an illegally distributed content to be identified. According to such methods the owner of the content issues media content, watermarked in a particular fashion, to a particular recipient. If the owner later recovers the content from a source other than the recipient, then he can extract the watermark thus identifying the recipient. He then concludes that the recipient has illegally retransmitted the content. The watermark is added to the content at the time of encoding. One of the requirements of a watermark is that it should not reduce the quality of the signal which is watermarked. Another requirement, although conflicting with the first requirement is that the watermark should be robust in that it should not be easy to remove by a third party. As is known, an encoding algorithm may include a frequency domain transform operation such as a forward discrete cosine transform. The encoding algorithm may also include a quantization process. On the decoding side, it is known for the decoding algorithm to include a de-quantization process, a frequency domain transform operation, such as an inverse discrete cosine transform, which matches or best approximates a match of the frequency domain transform operation in the encoding algorithm (the forward discrete cosine transform. The decoding algorithm may further comprise post-processing steps such as filtering and oversampling.

SUMMARY OF THE INVENTION

The present invention relates to a device, a system and a method for tracing at least one decoder of a video stream, the decoder being configured to implement at least one variant of a standard image decompression algorithm such that a resulting decompressed image approximation varies according to the particular decoder which was used.

The drawbacks of the conventional tracing solutions are overcome by providing a method for decoding video, the method for use in a decoder, the method yielding a video reconstruction output exhibiting characteristics which allow a unique identifier associated with the decoder to be traced, the decoder comprising means to decode video compressed according to an image compression algorithm, the method comprising:

decompressing the compressed video according to a tracing image decompression algorithm, the tracing image decompression algorithm being parameterised by the unique identifier to give a variant of an image decompression algorithm matching the image compression algorithm, said matching according to a standard image compression scheme.

According to another aspect of the present invention, there is provided a decoder for decoding video to yield a video reconstruction output which allows the decoder to be traced; the decoder having a decompression module configured to decompress video which has been compressed according to an image compression algorithm, said decompression being done according to an image decompression algorithm; the decoder characterised in that:

the image decompression algorithm is a variant of an image decompression algorithm matching the image compression algorithm, said matching according to a standard image compression scheme;

the tracing image decompression algorithm being parameterised by a unique identifier associated with the decoder;

the traceability being afforded by the video reconstruction output exhibiting characteristics which allow for the unique identifier a to be discovered.

A further object of the invention is a system to trace and uniquely identify decoder of a video stream comprising a plurality of decoders and at least one video stream encoder configured for broadcasting to said plurality of decoders video streams compressed by means of a standard type of image compression algorithm having intrinsic drifting limitations which result in slightly variable compressed video output, the system is characterized in that: at least one decoder is configured for processing broadcast video stream by using at least one image decompression algorithm variant whose drift is defined on the basis of an identifier of said decoder, the decoder's output decompressed video comprising a plurality of images slightly and uniquely modified according to the decompression algorithm modified by the identifier of the decoder.

According to yet a further aspect of the present invention, provision is made for system comprising a plurality of decoders for decoding video compressed according to an image compression algorithm to yield a plurality of video reconstruction outputs exhibiting characteristics which allow for at least one unique identifier associated with at least one decoder to be traced, each decoder being configured to carry out the method provided by an aspect of the invention.

The solution proposed here is a based on a different approach directly exploiting the physical limitations of the content decoder implementations to trigger diversified and traceable content decoding at the heart of the decoding process itself.

The present invention thereby aims to overcome drawbacks of conventional content tracing methods requiring reprocessing the content before its broadcast with a significant side channel transmission i.e. extra processing, storage and/or bandwidth at the distribution side, or alternately a complex signal processing implementation at the receiver side that has to be protected against hackers' attacks.

BRIEF DESCRIPTION OF THE DRAWINGS

The invention will be better understood with the following detailed description, which refers to the attached figures given as non-limitative examples.

FIG. 1 shows the block diagram of a conventional image processing algorithm, including compression and decompression, implemented by a video encoder (ENC) and its matching video decoder (DEC).

FIG. 2 shows different decoders (DEC1, DEC2, DEC3) controlling a combination of original and modified Inverse Discrete Cosine Transform steps (IDCTO, IDCTV) as part of a variant of an Inverse Discrete Cosine Transform operation to result in individual slightly modified output decompressed images (IMG0000, IMG0001, IMG0010).

DETAILED DESCRIPTION OF THE INVENTION

Figure 3:
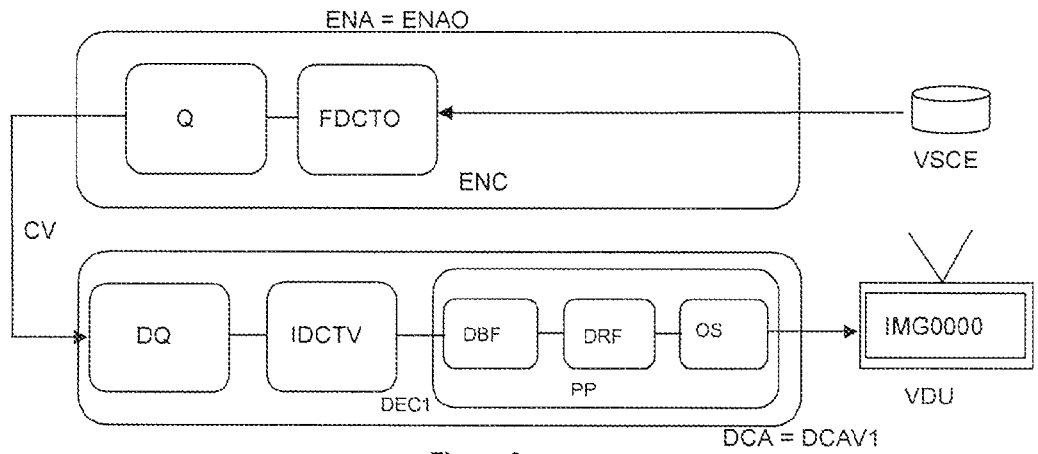
FIG. 3 shows the implementation of an Inverse Discrete Cosine Transform variant (IDCTV) specifically into the decoder (DEC1).

The present invention relates to a system and method to uniquely identify the decoder of a video stream wherein the decoder comprises a decompression module which implements at least one variant of a standard image decompression algorithm and wherein the resulting decompressed image approximation varies according to the decoder identifier. The image decompression algorithm thus employed is known as a tracing image decompression algorithm.

In one preferred embodiment, the proposed solution exploits the fundamental limitation of any lossy image compression scheme, namely the imprecision of the content transform such as the IDCT frequency domain transform (Inverse Discrete Cosine Transform) that is used in a number of decoding operations as specified by major video compression standards, to derive a unique video reconstruction output approximation that characterizes the decoder implementation.

Indeed, IDCT at decoding would be the perfect inverse operation of FDCT (Forward Discrete Cosine Transform) at coding stage if its results could be computed as infinite precision floating point values, which is not possible with the current processor technologies. Therefore most popular implementations of the FDCT and IDCT approximate them by a sequence of integer operations. Various integer approximations have been proposed in the literature that will result into a slightly different reconstructed image after decompression. The resulting imprecision is called IDCT mismatch or IDCT drift and has been the subject of multiple optimizations by video compression experts to make sure it does not drift to the stage of visually impacting the decompressed video. In fact, different IDCT decoder implementations will typically result into different decoded pictures from the same broadcast video stream source, although the difference will not always be perceptible to non-experts.

In early video compression standards specifications such as MPEG-1 and MPEG-2, the choice of the FDCT and IDCT algorithms is left to the implementers. By choosing a seldom-used transform, it is possible to get a unique video reconstruction output that is different from that of the most popular algorithm implementations. The invention consists in using this intrinsic drifting limitation to define diversity implementations of the decoder with a very minor impact to the decoder design, be it in silicon or software: each diversified implementation simply applies a different IDCT rounding algorithm and results in a different reconstructed video output that enables to trace the video back to its origin decoder.

In more recent video compression standards such as H.264, as depicted in FIG. 1, the frequency domain transform implementations (Forward Discrete Cosine Transform (FDCTO) and Inverse Discrete Cosine Transform (IDCTO)) have been fully specified so as to avoid drifting decompression results when non-matching algorithms are used in encoding and decoding. It is still possible to deviate from the standard implementation in certain applications, as long as the bitstream representation of the compressed encoder output (CV) remains compliant with the standard specification.

In those standards or as related implementation improvements, additional operations have also been proposed such as improved quantization (Q) at encoding and matching de-quantization (DQ) at decoding taking into account the human visual system properties, and/or post filtering of the reconstructed images at decoding so as to improve their subjective quality, for instance by applying a de-blocking filter (DBF) and a de-ringing filter (DRF) to the inverse transform output images, also at the level of expanding (OS) the sub-sampled color images (U and V planes of a YUV video) back into full resolution (from 420 sub-sampling for compression to 444 for display, for instance). Therefore, in addition or as a replacement of the inverse transform customization (IDCTO), the de-quantization (DO) and/or any of the post-processing steps (PP) including post-filtering (DBF, DRF) and/or colored image over-sampling algorithm (OS) can also be adapted so as to produce a different image reconstruction than the one from conventional, popular quantization and/or post-filtering and/or colored image over-sampling algorithms.

In keeping with the above, it is worth noting that when we speak of video compression standards, we include both the encoding algorithm, carried out by an encoder, and the decoding algorithm, carried out by the decoder. These two algorithms, respectively, may also be called compression algorithms and decompression algorithms. It follows that an encoding algorithm can include operations or processes such as a frequency domain transform (forward discrete cosine transform for example) and a quantization step. Likewise a decoding algorithm can include steps or operations such as a de-quantization step which matches the quantization step, a frequency domain transform which matches the frequency domain transform in the encoding algorithm and a post-processing step, including filtering (such as a deblocking filter and/or a deringing filter) and display oversampling. It is also apparent from above, but worth mentioning again, that the use of the word "matching" in the case of the de-quantization means the reverse of the quantization step; and the use of the word "matching" in the case of the inverse discrete cosine transform means as close an approximation as possible to the reverse of the forward discrete cosine transform. Specifications for how close this should be are given in the video compression standards.

One desirable feature of the invention is to trace the leaking content down to its individual decoder or player source. To this end, in particular in broadcast applications where millions of receivers may jointly receive and process the content, a diversity of implementations in the order of millions would be needed, which raises significant deployment issues in a broadcast ecosystem. Therefore, in a preferred embodiment, both a regular algorithm (IDCTO) and a drifting algorithm variant (IDCTV) are implemented in the decoder (DEC1; DEC2, DEC3) and the choice of applying the original (IDCTO) or the variant (IDCTV) is determined at block, pixel or video sequence level by the decoder itself (DEC1; DEC2, DEC3), based on a unique identifier (ID) that enables to trace it, for instance, but not limited to, a serial number, a decoder unique key, a host characterizing parameters information, or a certificate identifier.

This is illustrated for instance by FIG. 2 where three decoders (DEC1, DEC2, DEC3) are represented, each implementing both an original IDCT algorithm or operation (IDCTO) and an IDCT algorithm variant (IDCTV). In order to generate a slightly, uniquely modified image (IMG0000, IMG0001, IMG0010), each decoder (DEC1, DEC2, DEC3) selects the choice of the algorithm (IDCTV, IDCTO) based on its identifier (ID). Thus the complete decompression algorithm, known as the tracing image decompression algorithm (DCAV1, DCAV2, DCAV3), may comprise steps from the original IDCT operation and steps from the variant IDCT operation, depending on the unique identifier associated with the decoder. For instance decoder 0000 may always apply the variant algorithm (IDCTV), while decoder 0001 switches back to the original algorithm (IDCTO) on even numbered blocks in a given picture, as represented by FIG. 2, decoder 0010 switches back to the original algorithm (IDCTO) on odd blocks in a given picture, while a non-tracing decoder 0011 (reserved identifier for legacy decoders in this example—not shown in FIG. 2) applies the original algorithm (IDCTO) on all odd and even blocks, etc, so that the resulting picture modifications discriminate between them. While FIG. 2 specifically illustrates the tracing differentiation in the case of the IDCT algorithm variant implementation, it is of course possible to apply the same principle to a variant of the de-quantization (DQ) or the post-processing algorithms (DBF, DRF, OS) or even a combination of variant implementations, possibly also at different levels in the overall decoding process (rows of macro-blocks, block decoding, motion compensation, etc.).

Moreover, the individual decoder tracing process may be systematically executed by each decoder in a passive, autonomous way or alternately it may be triggered by security control commands transmitted from a control centre to each decoder with the content or separately, for instance by means of Entitlement Management Messages (EMMs) sent by a Conditional Access System (CAS). This enables the design and deployment of diversified anti-piracy countermeasure mechanisms by activating the tracing feature only in certain circumstances, triggered by the transmission of a specific control message to the decoders. In a possible implementation, this messaging may be targeted specifically to a subset of the decoders in the deployment field, as dictated by the content sharing piracy monitoring needs. In order to optimize the messaging needs, especially in a broadcast environment, it is also possible to address decoders in predefined groups, for instance to trace a certain software decoder release globally rather than individually.

Figure 4:
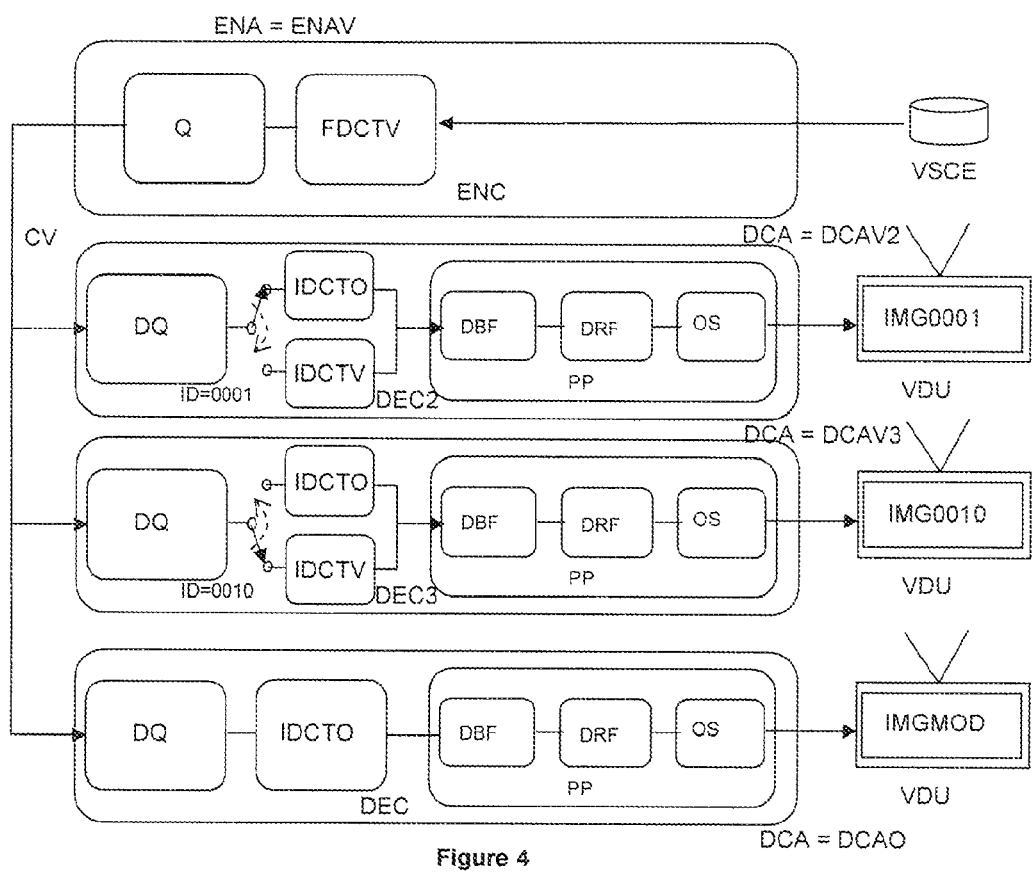
FIG. 4 shows the implementation of a Forward Discrete Cosine Transform variant (FDCTV) at the encoder (ENC) and the implementation of the original Inverse Discrete Cosine Transform (IDCTO) operation as well as the encoder matching Inverse Discrete Cosine Transform variant (IDCTO) into tracing capable decoders (DEC2, DEC3), while non tracing capable decoders (DEC) only implement the original Inverse Discrete Cosine Transform operation (IDCTO).

In one embodiment, as shown by FIG. 3, only the decoder implementation (DEC1) is modified with one or several algorithm variants (IDCTV) while the encoder still applies the conventional encoding algorithms (FDCTO) that have been optimized for better video reconstruction quality at a given transmission bit-rate. In that case, the decoders supporting the tracing features will output slightly altered reconstructed videos while standard decoders (DEC) available in the market still output fully compliant videos (IMG) of better quality to expert eyes. In order to overcome this drawback, in one embodiment as illustrated by FIG. 4, the encoding implementation (ENAV) is also modified to replace the conventional algorithm of FDCT, IDCT or quantization by a specific one that will result in a drifting effect from standard decoder implementations, while the matching inverse algorithms are implemented specifically in the tracing-capable decoders (DEC2, DEC3), so that traceable reconstructed videos (IMG0001, IMG0010) are of better quality than the non-matching legacy decoders (DEC) outputs (IMGMOD). Preferably, the tracing decoders implement both the conventional and the specific algorithms and selectively apply them at block, image or video sequence level so as to keep a certain drift in the output reconstructed video that uniquely characterizes the decoder (DEC2, DEC3).

The invention claimed is:

1. A decoder for decoding video compressed according to a first image compression algorithm to yield a video reconstruction output; the decoder comprising:
    a decompression module configured to decompress the compressed video;
    wherein the decompression module is configured to apply a first image decompression algorithm which matches, the first image compression algorithm or a second image decompression algorithm which does not match the first image compression algorithm, and to selectively switch between the first and second image decompression algorithms depending on a unique identifier with which the decoder is associated;
    the video reconstruction output thereby exhibiting the selective switching between the first and second image decompression algorithms in dependence on the unique identifier, which allows for the decoder associated with the unique identifier to be traced.

2. The decoder according to claim 1, wherein the first image compression algorithm comprises an encoding frequency domain transform operation and the first and second image decompression algorithms comprise:
    a decoding frequency domain transform operation.

3. The decoder according to claim 1, wherein the decoder is configured to switch between the first and second image decompression algorithms on a pixel by pixel basis, a block by block basis or a video sequence by video sequence basis.

4. The decoder according to claim 2, wherein the decoder is configured to switch between the first and second image decompression algorithms depending on reception of a predetermined trigger.

5. The decoder according to claim 4, wherein the decoder is configured to cooperate with a security module, the security module being configured to issue the predetermined trigger upon reception of a predetermined security message from a control center.

6. A method for decoding video a decoder, compressed according to a first image compression algorithm, the method comprising:
    decompressing the compressed video by selectively switching, based on a unique identifier associated with the decoder, between a first decompression algorithm which matches the first image compression algorithm, and a second decompression algorithm which does not match the first image compression algorithm, whereby the decompressed video exhibits the selective switching between the first and second image decompression algorithms based on the unique identifier, which allows the decoder with which the unique identifier is associated to be traced.

7. The method according to claim 6, wherein the first image compression algorithm is a standard, lossy, image compression algorithm.

8. The method according to claim 6, wherein the first image compression algorithm is a variant of a standard, lossy, image compression algorithm.

9. The method according to claim 6, wherein the first image compression algorithm comprises an encoding frequency domain transform operation and the first and second decompression algorithms comprise a decoding frequency domain transform operation.

10. The method according to claim 9, wherein the encoding frequency domain transform operation and the decoding frequency domain transform operation are discrete cosine transforms.

11. The method according to claim 9, wherein the switching is carried out on a pixel by pixel basis, a block by block basis or a video sequence by video sequence basis.

12. The method according to claim 6, wherein the first image compression algorithm comprises a quantization step and the first and second image decompression algorithms comprise a de-quantization step.

13. The method according to claim 6, wherein the second image decompression algorithm includes a post-processing step being a variant of a standard post-processing step according to the standard image compression scheme.

14. The method according to claim 6, wherein the unique identifier is an identifier selected from a group comprising a serial number, a decoder unique key, a decoder software version identifier, a certificate identifier, a datum characterizing a host with which the decoder is configured to cooperate, or a datum characterizing a security module with which the decoder is configured to cooperate.

15. The method according to claim 8, wherein the first image compression algorithm is a standard, lossy, image compression algorithm.

16. The decoder according to claim 1, wherein the standard image compression scheme specification is a selected one of a:
    MPEG-1;
    MPEG-2; and
    H.264.

* * * * *